United States Patent [19]

Krippelz, Jr

[11] Patent Number: 5,246,320
[45] Date of Patent: Sep. 21, 1993

[54] KEYWAY BROACH TOOL AND METHOD OF BROACHING MULTIPLE KEYWAYS

[76] Inventor: Jacob Krippelz, Jr, 33 Windwood Dr., Aurora, Ill. 60506

[21] Appl. No.: 859,920

[22] Filed: Mar. 30, 1992

[51] Int. Cl.$^5$ ............................................. B23D 37/09
[52] U.S. Cl. ................................. 409/244; 409/259; 409/304; 409/287
[58] Field of Search ............... 409/244, 259, 265, 287, 409/304, 299, 300, 143; 408/241 B

[56] References Cited

U.S. PATENT DOCUMENTS

| | | | |
|---|---|---|---|
| 131,293 | 9/1872 | Mooney | 409/304 |
| 2,475,227 | 7/1949 | Evans | 409/143 |
| 2,510,835 | 6/1950 | Rice | 409/259 |
| 5,150,996 | 9/1992 | Thoroughman | 409/304 X |

*Primary Examiner*—Z. R. Bilinsky
*Attorney, Agent, or Firm*—Patnaude, Videbeck & Marsh

[57] ABSTRACT

A tool for guiding a push type keyway broach in the broaching of one or more keyways in a single bore of a workpiece includes a bushing fitable into the bore of the workpiece, a rectilinear guideway in the bushing for slidably receiving the base portion of a conventional push type broach, and a guide pin receivable in a selected one of a plurality of angularly spaced radial holes in the bushing and having an externally extending portion dimensioned to slidable fit into a previously broached keyway, thereby to precisely set and hold the broach at a selected, predetermined angle relative to the previously broached keyway.

7 Claims, 1 Drawing Sheet

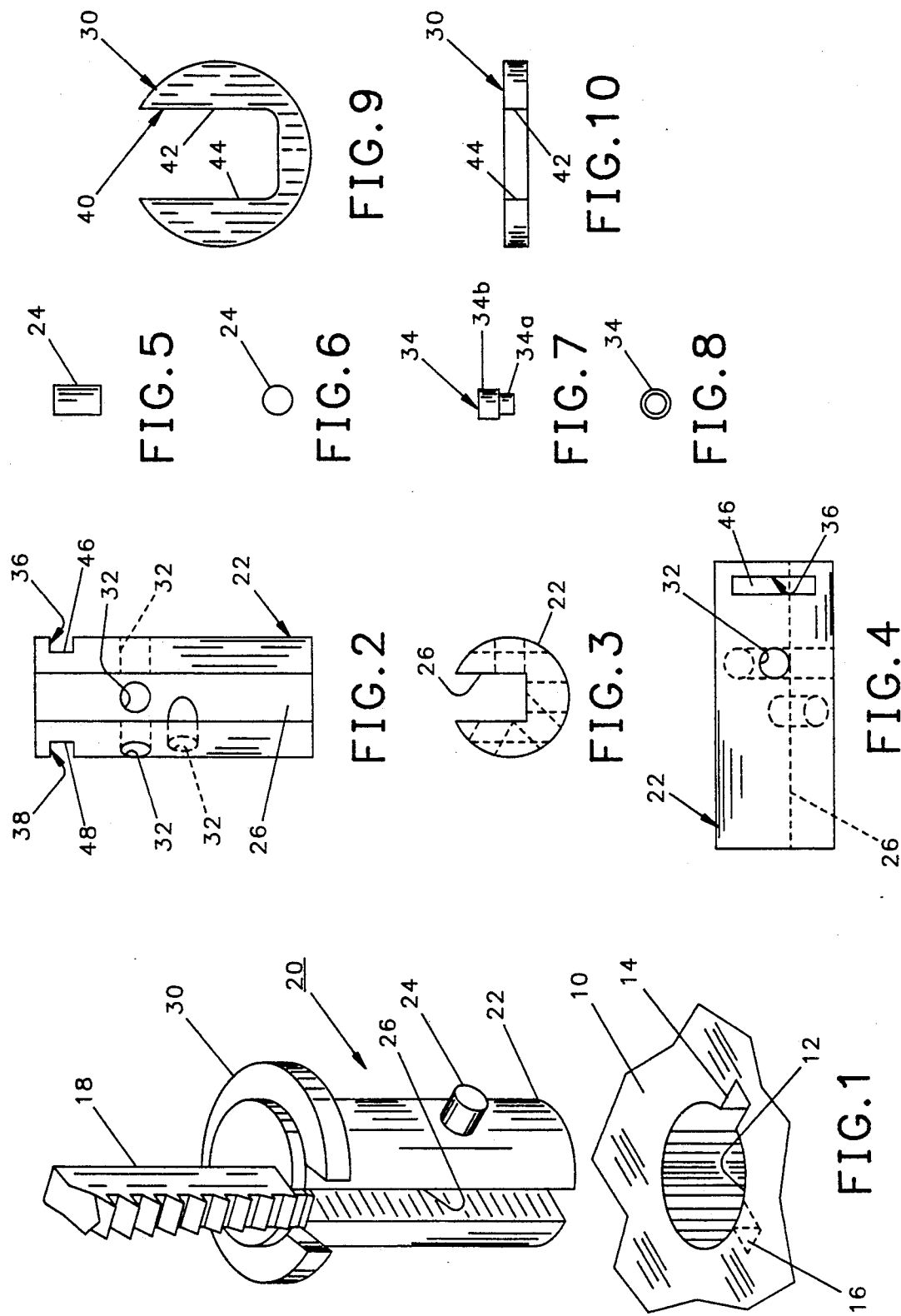

KEYWAY BROACH TOOL AND METHOD OF BROACHING MULTIPLE KEYWAYS

The present invention relates in general to a new and improved tool for broaching a plurality of keyways in a bore, and it further relates to a new and improved method of broaching a plurality of keyways in a bore.

BACKGROUND OF THE INVENTION

The methods which were heretofore used to broach multiple keyways in a single bore were expensive in the time required to set up the broaching guide or bushing and in the cost of the indexing systems used to align the broach or broaches with respect to one another. It would be desirable to provide a relatively simple and inexpensive broach alignment tool which may be easily and quickly set up to broach multiple keyways in a bore. It would be further desirable to enable the use of the broach alignment tool with standard push broaches for broaching keyways at the standard angles relative to one another in all standard bore sizes.

SUMMARY OF THE INVENTION

Briefly, there is provided in accordance with the present invention a novel broach guide tool which includes a plurality of broach guide bushings having a plurality of respective outer diameters for use with all standard bore sizes. Each of the bushings is provided with an external longitudinal guide groove which is adapted to slidably receive the base of a push-type keyway broach, and one or more angularly spaced radial holes for selectively receiving a guide pin. The guide pin includes a portion which extends radially outward from the bushing and is adapted to be slidably received in a previously broached keyway in the bore. One or more additional pins are provided having different external diameters for slidably fitting in keyways having different widths, and additional radial holes for receiving the guide pin are provided at a plurality of different angularly spaced positions.

In a preferred embodiment of the invention, an external collar is fitable onto the bushing near one end thereof to secure the bushing to the workpiece in which the keyways are being broached, thereby to prevent pushing of the broach through the bore.

In use, the bushing is positioned in the bore in which the keyways are to be broached and a push broach is pushed through the bore while the base of the broach is in the broach guide groove thereby to broach a keyway in the conventional manner. The bushing is then removed from the bore and a guide pin is positioned in a selected one of the radial holes which is spaced from the broach guide groove by the desired angle between the first keyway and a second keyway to broached in the same bore. The bushing is again inserted into the bore with the guide pin extending into the first keyway. The push broach is then pushed through the bore while the base thereof is in the guide groove thereby to broach a second keyway in the bore at the selected angle relative to the first keyway.

GENERAL DESCRIPTION OF THE DRAWINGS

The present invention will be better understood from a reading of the following detailed description of a preferred embodiment taken in connection with the accompanying drawing wherein:

FIG. 1 is an isometric view of a broach guide tool embodying the present invention in use with a workpiece in the bore of which a first keyway has been broached and a second keyway shown in phantom is to be broached;

FIG. 2 is an elevational view of a guide bushing forming a part of the tool of the present invention;

FIG. 3 is a bottom view of the guide bushing shown in FIG. 2;

FIG. 4 is an elevational view taken from the right hand side of FIG. 2;

FIG. 5 is an elevational view of a guide pin for use with the bushing shown in FIGS. 2, 3, and 4;

FIG. 6 is a plan view of the guide pin shown in FIG. 5;

FIG. 7 is an elevational view of another guide pin for use with the bushing shown in FIGS. 2, 3, and 4;

FIG. 8 is a plan view of the guide pin shown in FIG. 7;

FIG. 9 is a plan view of a locking collar for use with the bushing shown in FIGS. 2, 3, and 4; and FIG. 10 is an elevational view of the locking collar shown in FIG. 9.

DETAILED DESCRIPTION OF A PREFERRED EMBODIMENT OF THE INVENTION

Referring to FIG. 1, there is shown a portion of a workpiece 10 having a cylindrical bore 12 therein in which a first keyway 14 has been broached or provided in some other manner. The keyway is rectangular in cross section. A second keyway 16, shown in phantom, is to be broached at a precise, predetermined angle from the first keyway 14 by means of a conventional push type broach 18.

As shown, a broach guide tool 20 embodying the present invention includes a guide bushing 22 which is slip fitted into the bore 12 with a guide pin 24, which extends radially outward from the bushing 22, and in slip fitted into the previously formed keyway 14. The externally extending portion of the guide pin 24 in has an external diameter which is slightly less than but substantially equal to the width of the keyway 14.

A guide slot 26 is provided in the external wall of the bushing 22 and may be seen to extend from one end of the bushing 22 to the other. The guide slot is rectangular in cross section and is dimensionally adapted to receive the base portion of the standard push type keyway broach 18. Inasmuch as the guide pin 24 is at a fixed predetermined angle from the broach guide slot 26, the second keyway will be positioned in the bore 12 at a precise predetermined angle from the first keyway.

In use, the bushing 22 with the pin 24 assembled thereto is fitted into the bore 12 and affixed thereto in any suitable manner. However, there is provided in accordance with another feature of the invention a retaining collar 30 which fits onto the bushing 22 near the top thereof as shown in FIG. 1 in order to prevent the bushing 22 from being pushed farther into the bore 12 as the broach is pushed therethrough. As is described in greater detail hereinafter in connection with FIGS. 9 and 10, the collar 30 is provided with a slot which is aligned with the broach guide slot 26 in the bushing 22 and through which the broach 18 is adapted to be pushed during the broaching of the second or subsequent keyways.

Referring particularly to FIGS. 2 through 6, it will be seen that the bushing 22 is provided with a plurality of radially drilled holes 32 for receiving the base or shank portion of a solid cylindrical guide pin 24. The holes 32 are angularly spaced with respect to one another to enable the broaching of multiple keyways at angles of forty-five degrees apart, sixty degrees apart, ninety degrees apart, and one hundred eighty degrees apart. These are the conventional locations for multiple keyways in a common bore, but the holes 32 could be positioned at other angular positions if desired. Also, it may be seen from an inspection of FIGS. 2 and 4 that the holes 32 are not all located in the same plane to prevent interference of one such hole with another. It may thus be seen, that while the tool 20 may be used in the broaching of a single keyway, it is particularly useful in the broaching of multiple keyways including two, four, six, and eight equally spaced keyways.

In order to permit use of the same tool when broaching keyways of different widths, additional guide pins 34 may be provided. The pin 34 has a base or shank portion 34A having an external diameter substantially equal to the internal diameter of the holes 32 and a larger outer portion 34B which has an external diameter adapted to be slip fitted into a keyway which is larger in width than the diameters of the holes 32.

In order to mount the collar 30 to the bushing 22, a pair of slots 36 and 38 are milled in the bushing 22 near one end thereof, and the collar 30 has a generally rectangular slot 40 having side walls 42 and 44 which fit snugly against the bottom walls 46 and 48 of the respective slots 36 and 38. The walls 46 and 48 are parallel to one another and to the side walls of the broach guide groove 26, whereby the slot 40 is aligned with the guide groove 26 to prevent interference of the collar 30 with the movement of the broach 18 through the bushing 22. The collar 30 thus substantially surrounds the bushing, and having a larger outer diameter than that of the bore 12 prevents the tool 20 from being pushed through the bore 12 during the broaching operation.

Method of Operation

A complete broaching tool embodying the present invention includes a number of broach guide bushings having respective outer diameters to service standard bore sizes from one-half inch to two and one-half inches in one-sixteenth inch increments. Also both straight and shoulder guide pins are provided to permit of the tool with all standard bore and keyway size combinations. A collar 30 is also provided although the tool can be used without the collar if desired.

When the tool 20 is to be used, a bushing 22 having the proper diameter to be slip fitted in the bore of the workpiece in which one or more keyways are to be broached is elected. Since the tool 20 can be used when broaching a single keyway, additional broach guide bushings of the prior art type are not required for the broaching of single keyways. After a single keyway has been broached, a guide pin of the proper size to match the width of the previously broached keyway is selected and inserted into the guide pin hole 32 which is spaced the desired angularly distance from the broach guide groove 26. The bushing is then inserted into the bore with the guide pin positioned in the previously broached keyway.

The broach 18 is then inserted into the broach guide groove 26 and pushed through the workpiece to broach a second guideway therein. This process may be repeated to broach additional keyways in the workpiece at the precise angular positions desired.

It will be understood that many changes and modifications may be made to the tool described herein without departing from the true spirit and scope of the present invention, and therefore, it is intended to cover all such changes and modifications by the claims which are appended hereto.

What is claimed:

1. A method of broaching a plurality of keyways in a cylindrical bore, comprising the steps of
providing an elongate bushing having a broach guide groove extending longitudinally from one end of said bushing to the other end thereof, and further having a plurality of radial holes in angularly spaced mutual relationship,
positioning said bushing in said bore,
pushing a keyway broach through said bore with the base of said broach disposed in said guide groove to broach a first keyway in said bore,
removing said broach from said guideway and inserting a guide pin in a selected one of said holes with a portion of said guide pin extending outwardly from said bushing, said outwardly extending portion of said guide pin having an external cross-sectional dimension corresponding to the width of said first keyway,
inserting said bushing into said bore with said pin extending into said first keyway, and
pushing a broach through said bore with the base of said broach disposed in said guideway to broach another keyway in said bore in angularly spaced relationship with said first keyway.

2. A broach alignment tool for use in broaching a plurality of keyways in a cylindrical bore, comprising in combination
a generally cylindrical, elongate bushing having an external side and a longitudinal guide groove therein for guiding a broach positioned in said groove, and a length,
a plurality of radial holes in said bushing opening on said external side, and
a guide pin receivable in any one of said radial holes with a keyway receiving portion thereof extending outwardly therefrom,
said keyway receiving a portion extending outwardly from said bushing having an external diameter which is less than but approximately equal to the width of said guide groove whereby said pin is slidable in said guide groove.

3. A broach guide tool according to claim 2, wherein two of said radial holes are spaced 45 degrees apart.

4. A broach guide tool according to claim 2, wherein two of said radial holes are spaced 30 degrees apart.

5. A broach guide tool according to claim 2, wherein two of said radial holes are spaced 60 degrees apart.

6. A broach guide tool according to claim 2, wherein the axes of said radial holes are angularly spaced 45 degrees, 60 degrees, 90 degrees and 180 degrees apart.

7. A broach alignment tool for use in broaching a plurality of keyways in a cylindrical bore, comprising in combination
a generally cylindrical, elongate bushing having a longitudinal guide groove therein for guiding a broach positioned in said groove and having an end,
at least one radial hole in said bushing opening on the external side thereof, a guide pin receivable in said radial hole with a keyway receiving portion thereof extending outwardly therefrom, said keyway receiving portion extending outwardly from said bushing having an external diameter which is less than but approximately equal to the width of said guide groove whereby said pin is slidable in said guide groove, a collar fitable onto said bushing near said end, a pair of rectilinear grooves provided in said bushing near said end with each of said grooves having a bottom wall and parallel side walls, said collar being provided with a radial slot having a width approximating the distance between the bottom walls of said grooves, whereby said collar may be slipped transversely onto or off said bushing and is locked against longitudinal movement relative to said bushing when assembled thereto.

* * * * *